(12) United States Patent
Daunch et al.

(10) Patent No.: US 12,551,691 B2
(45) Date of Patent: Feb. 17, 2026

(54) IMPLANTABLE RESERVOIR FOR USE WITH A MEDICAL DEVICE AND SYSTEM FOR INTERVENTIONAL DRUG DELIVERY

(71) Applicant: ADVANCED CHEMOTHERAPY TECHNOLOGIES, INC., Raleigh, NC (US)

(72) Inventors: William Daunch, Cary, NC (US); Anthony S. Voiers, Raleigh, NC (US); Dale Carlson, Jr., Zimmerman, MN (US); Blane Larson, Maple Lake, MN (US)

(73) Assignee: CONTINUITY BIOSCIENCES, LLC, Cary, NC (US)

( * ) Notice: Subject to any disclaimer, the term of this patent is extended or adjusted under 35 U.S.C. 154(b) by 1106 days.

(21) Appl. No.: 17/297,344

(22) PCT Filed: Nov. 25, 2019

(86) PCT No.: PCT/US2019/062990
§ 371 (c)(1),
(2) Date: May 26, 2021

(87) PCT Pub. No.: WO2020/112625
PCT Pub. Date: Jun. 4, 2020

(65) Prior Publication Data
US 2022/0218978 A1 Jul. 14, 2022

Related U.S. Application Data

(60) Provisional application No. 62/771,207, filed on Nov. 26, 2018.

(51) Int. Cl.
*A61N 1/00* (2006.01)
*A61K 9/00* (2006.01)
(Continued)

(52) U.S. Cl.
CPC .......... *A61N 1/0448* (2013.01); *A61K 9/0009* (2013.01); *A61K 31/7068* (2013.01);
(Continued)

(58) Field of Classification Search
CPC .... A61N 1/327; A61N 1/0448; A61N 1/0428; A61N 1/048; A61N 1/30; A61N 1/325;
(Continued)

(56) References Cited

U.S. PATENT DOCUMENTS 3,640,277 A * 2/1972 Adelberg ............ A61M 5/1483
222/61
5,062,834 A * 11/1991 Gross .................... A61M 5/155
604/145

(Continued)

FOREIGN PATENT DOCUMENTS

JP 2000229128 8/2000
JP 2003516828 5/2003
(Continued)

OTHER PUBLICATIONS

Daunch, William; First Examination Report for India Patent Application No. 202117027906 filed Jun. 22, 2021, mailed Jan. 2, 2023; 7 pages.
(Continued)

*Primary Examiner* — Bhisma Mehta
*Assistant Examiner* — Tania Ismail
(74) *Attorney, Agent, or Firm* — Taylor Duma LLP

(57) ABSTRACT

A surgically implantable reservoir is provided for implantation into a patient for use in an iontophoresis system for local drug delivery through a target site of internal body tissue. The reservoir comprises a housing having an inner surface defining an enclosed chamber and an inlet opening and an outlet opening for flow of fluid including the drug through the chamber. The housing is capable of interacting
(Continued)

with a localized electric field to release the drug. A platform holding an electrode extends inwardly into the chamber from the inner surface of the housing such that the platform and an adjacent portion of the inner surface of the housing define a trough surrounding the platform. Fluid flow through the reservoir from the inlet opening to the outlet opening moves gas bubbles formed by electrolysis from the surface of the electrode and carries the bubbles through the outlet opening.

15 Claims, 11 Drawing Sheets

(51) Int. Cl.
| | | |
|---|---|---|
| *A61K 31/7068* | (2006.01) | |
| *A61M 37/00* | (2006.01) | |
| *A61N 1/04* | (2006.01) | |
| *A61N 1/30* | (2006.01) | |
| *A61N 1/36* | (2006.01) | |
| *A61M 5/142* | (2006.01) | |
| *A61M 31/00* | (2006.01) | |
| *A61M 39/02* | (2006.01) | |
| *A61N 1/32* | (2006.01) | |

(52) U.S. Cl.
CPC ....... *A61M 37/0069* (2013.01); *A61N 1/0444* (2013.01); *A61N 1/306* (2013.01); *A61N 1/36002* (2017.08); *A61M 2005/14204* (2013.01); *A61M 5/14276* (2013.01); *A61M 31/002* (2013.01); *A61M 2037/0007* (2013.01); *A61M 39/0208* (2013.01); *A61N 1/0428* (2013.01); *A61N 1/048* (2013.01); *A61N 1/30* (2013.01); *A61N 1/325* (2013.01); *A61N 1/327* (2013.01)

(58) Field of Classification Search
CPC . A61N 1/0444; A61N 1/306; A61M 5/14276; A61M 31/002; A61M 39/0208; A61M 2005/14204
See application file for complete search history.

(56) References Cited

U.S. PATENT DOCUMENTS

| | | | |
|---|---|---|---|
| 5,087,243 | A | 2/1992 | Avitall |
| 5,090,963 | A * | 2/1992 | Gross .................... A61M 5/155 |
| | | | 222/105 |
| 5,527,288 | A * | 6/1996 | Gross ................ A61M 5/14593 |
| | | | 604/145 |
| 9,987,417 | B2 * | 6/2018 | Shih .................. A61M 5/14276 |
| 2002/0082543 | A1 * | 6/2002 | Park .................. A61M 37/0015 |
| | | | 604/20 |
| 2003/0060797 | A1 | 3/2003 | Fischer |
| 2008/0015494 | A1 * | 1/2008 | Santini, Jr. ........ A61M 5/14248 |
| | | | 604/65 |
| 2008/0177219 | A1 | 7/2008 | Joshi |
| 2016/0022985 | A1 | 1/2016 | Desimone et al. |
| 2016/0184612 | A1 | 6/2016 | Desimone et al. |

FOREIGN PATENT DOCUMENTS

| | | |
|---|---|---|
| JP | 2012519032 | 8/2012 |
| JP | 2013519411 | 5/2013 |
| SE | 376278 | 5/1975 |

OTHER PUBLICATIONS

Daunch, William; Office Action for Japan Patent Application No. 2021-529737, filed Nov. 25, 2019, mailed Oct. 30, 2023, 7 pgs.

Daunch, William; International Search Report and Written Opinion for Application No. PCT/US2019/062990, filed Nov. 25, 2019, mailed Mar. 20, 2020, 12 pages.

Daunch William; Notice of Preliminary Rejection (Request for the Submission of an Opinion) for Korean patent application No. 10-2021-7019927, filed Nov. 25, 2019, mailed Sep. 12, 2024, 9 pgs.

Daunch, William; Examination Report for Australia Patent Application No. 2019388777, filed Nov. 25, 2019, mailed Jun. 17, 2024, 3 pgs.

Daunch, William; Notice of Acceptance for Australia Patent Application No. 2019388777, filed Nov. 25, 2019, mailed May 27, 2025, 3 pgs.

Daunch, William; Office Action for Canada Patent Application No. 3121123, filed Nov. 25, 2019, mailed Jul. 7, 2025, 4 pgs.

Daunch William; Notice of Allowance for Korean patent application No. 10-2021-7019927, filed Nov. 25, 2019, mailed Sep. 30, 2025, 8 pgs.

* cited by examiner

IMPLANTABLE RESERVOIR FOR USE WITH A MEDICAL DEVICE AND SYSTEM FOR INTERVENTIONAL DRUG DELIVERY

BACKGROUND

A medical device and system for interventional drug delivery are described and, more particularly, an implantable reservoir for use with an iontophoresis device and system for targeted drug delivery.

Delivery of chemotherapy directly into affected organs offers a solution for cancers that are difficult to treat with systemic therapy alone. In one application, a device designed to infuse chemotherapy drugs is implanted directly into a tumor. This technology allows for more targeted drug delivery of higher doses directly to the tumor, largely sparing surrounding tissues. By treating the tumor directly, doctors can theoretically shrink the tumor to an operable size with a smaller dose of chemotherapy. This approach should also significantly reduce the side effects of systemic toxicity on the patient.

Pancreatic cancer is an example of a disease that is difficult to treat. The pancreas is in a challenging location near critical organs and vessels. As a pancreatic tumor grows into adjacent tissues, it can invade the liver or the stomach, and more often invades local vasculature, rendering the tumor inoperable. Moreover, the pancreatic tumor is resistant to conventional systemic chemotherapy due to a dense fibroblastic stroma which surrounds the tumor. Current systemic treatments attempt to overcome these difficulties by increasing the dosage of intravenously administered chemotherapy. However, this rarely works, and the high dosage is exceptionally hard on the patient.

A medical device that implants directly onto the pancreas may be used to infuse chemotherapy drugs, such as gemcitabine, directly into a pancreatic tumor. The device uses iontophoresis to drive chemotherapy drugs into the tumor using electrical currents that pass through the drug solution into the tissue. The device includes an implantable reservoir containing the drugs and an electrode. The implanted reservoir is connected through the abdomen to an infusion pump and electrical leads. The circuit is completed by a second electrode on the back of the patient for generating an electrical field. Iontophoresis uses electromotive and electro-osmotic forces which cause chemotherapy to pass across the stroma and into the tumor. One such device is described in U.S. Patent Application Publication No. 2016/0022985, titled Interventional Drug Delivery System and Associated Methods, the contents of which application are hereby incorporated by reference herein in their entirety.

A problem with the device is electrolysis causes bubbles to form in the reservoir and adhere to the electrode surface. The bubbles change the impedance of the electrode, which then requires a higher voltage. However, the voltage must remain below 25V to ensure there are no adverse effects on the patient. In addition, the orientation of the device on the pancreas may affect any mechanism to sweep the bubbles off the electrode.

For the foregoing reasons, there is a need for an implantable reservoir for use with an iontophoresis device and system which minimizes adherence of bubbles to the electrode surface by removal of the bubbles. Ideally, the bubble removal process should work regardless of the orientation of the reservoir.

SUMMARY

A surgically implantable reservoir is provided for implantation into a patient for use in an iontophoresis system for local drug delivery through a target site of internal body tissue. The iontophoresis system includes a source electrode and a counter electrode in electrical communication with the source electrode for forming a localized electric field at the target site. The reservoir comprises a housing having an inner surface defining an enclosed chamber and an inlet opening and an outlet opening for flow of fluid including the drug through the chamber. The housing is capable of interacting with the localized electric field to release the drug. A platform extends inwardly into the chamber from the inner surface of the housing such that the platform and an adjacent portion of the inner surface of the housing define a trough surrounding the platform. The platform is adapted for holding the source electrode. Means are provided for securing the housing to the tissue of the target site. In use, fluid flow through the reservoir from the inlet opening to the outlet opening moves gas bubbles formed by electrolysis from the surface of the electrode and carries the bubbles through the outlet opening.

An iontophoresis system is also provided for local drug delivery through a target site of internal body tissue. The iontophoresis system comprises a source electrode and a counter electrode in electrical communication with the source electrode, the counter electrode being configured to cooperate with the source electrode to form a localized electric field at the target site. A fluid cargo including the drug is capable of being delivered through the tissue of the target site when exposed to the localized electric field formed between the source electrode and the counter electrode. A surgically implantable reservoir is adapted to be secured to the target site. The reservoir comprises a housing having an inner surface defining an enclosed chamber and an inlet opening and an outlet opening for cargo flow through the chamber. The housing capable of interacting with the localized electric field to release the cargo. A platform extends inwardly into the chamber from the inner surface of the housing such that the platform and an adjacent portion of the inner surface of the housing define a trough surrounding the platform. The platform adapted for holding the source electrode. Means are provided for securing the housing to the tissue of the target site. In use, cargo flow through the reservoir from the inlet opening to the outlet opening moves gas bubbles formed by electrolysis from the surface of the electrode and carries the bubbles through the outlet opening.

In one aspect, the source electrode comprises a platinum electrode.

In another aspect, the cargo comprises anesthetics, vaccines, chemotherapeutic agents, metabolites, immunomodulators, antioxidants, antibiotics, and ion channel regulators, or hormones. The cargo may further comprise one or more pharmaceutically acceptable carriers, excipients, or diluents. In one embodiment, the cargo comprises a therapeutic agent, which may comprise gemcitabine. A source of cargo in fluid communication with the inlet opening flows cargo into the housing.

In a further aspect, the outlet opening from the chamber is spaced from the inlet opening. In an embodiment, the outlet opening is opposite the inlet opening.

The housing securing means may comprise a skirt around at least a portion of the reservoir, wherein the skirt may be sutured to tissue at the target site. The skirt comprises a plurality of anchor points defining suture openings. In another embodiment, the housing securing means comprises a biological adhesive.

In yet another embodiment, at least a portion of the housing of the reservoir comprises a membrane, which may be semi-permeable in nature. The membrane allows drug to pass through the membrane and into the targeted tissue when a localized electric field is applied. The membrane may comprise natural or synthetic polyomers, such as cellulose acetate, polysulfone, polycarbonate, polyamide, or polyacryl-polyamide acrylate.

A method is also provided for local delivery of drug molecules by iontophoresis through a target site of internal body tissue of a patient. The drug delivery method comprises the steps of providing a source electrode and a counter electrode in electrical communication with the source electrode. The counter electrode is configured to cooperate with the source electrode to form a localized electric field at the target site. A reservoir is implanted in the patient and secured to the target site. The reservoir comprises a housing having an inner surface defining an enclosed chamber having an inlet opening and an outlet opening for fluid flow through the chamber. A platform extends inwardly into the chamber from the inner surface of the housing such that the platform and an adjacent portion of the inner surface of the housing define a trough surrounding the platform. The platform is adapted for holding the source electrode. Means are provided for securing the housing to the tissue of the target site. A fluid cargo including the drug is delivered to an inlet opening of the housing. The fluid cargo is capable of being delivered through the tissue of the target site when exposed to the localized electric field formed between the source electrode and the counter electrode. The housing is capable of interacting with the localized electric field to release the cargo. Cargo flow through the reservoir from the inlet opening to the outlet opening moves gas bubbles formed by electrolysis from the surface of the electrode and carries the bubbles through the outlet opening.

In one aspect, the step of delivering fluid cargo comprises a continuous flow of fluid cargo.

In another aspect, the step of providing a counter electrode comprises placing the counter on the skin of the patient.

BRIEF DESCRIPTION OF THE DRAWINGS

For a more complete understanding of the reservoir for use with a drug delivery device and system, reference should now be had to the embodiments shown in the accompanying drawings and described below.

In the drawings.

DESCRIPTION

Certain terminology is used herein for convenience only and is not to be taken as a limiting. For example, words such as "upper," "lower," "left," "right," "horizontal," "vertical," "upward," "downward," "top" and "bottom" merely describe the configurations shown in the FIGS. Indeed, the components may be oriented in any direction and the terminology, therefore, should be understood as encompassing such variations unless specified otherwise. The words "interior" and "exterior" refer to directions toward and away from, respectively, the geometric center of the core and designated parts thereof. The terminology includes the words specifically mentioned above, derivatives thereof and words of similar import.

Figure 1:
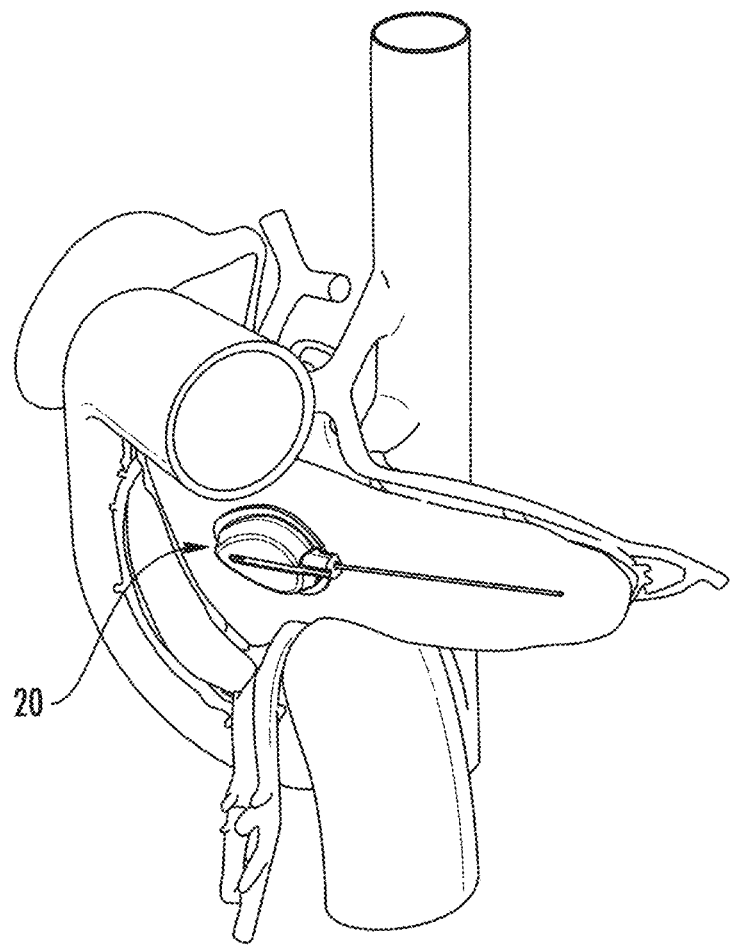
FIG. 1 is a schematic perspective of an embodiment of a reservoir attached to an anterior surface of a human pancreas.

Referring now to the drawings, wherein like reference numerals designate corresponding or similar elements throughout the several views, a system for drug delivery using iontophoresis is shown in FIG. 1 disposed on a human pancreas. The iontophoresis system includes an embodiment of a reservoir assembly for targeted drug delivery, which is generally designated at 20.

Figure 2:
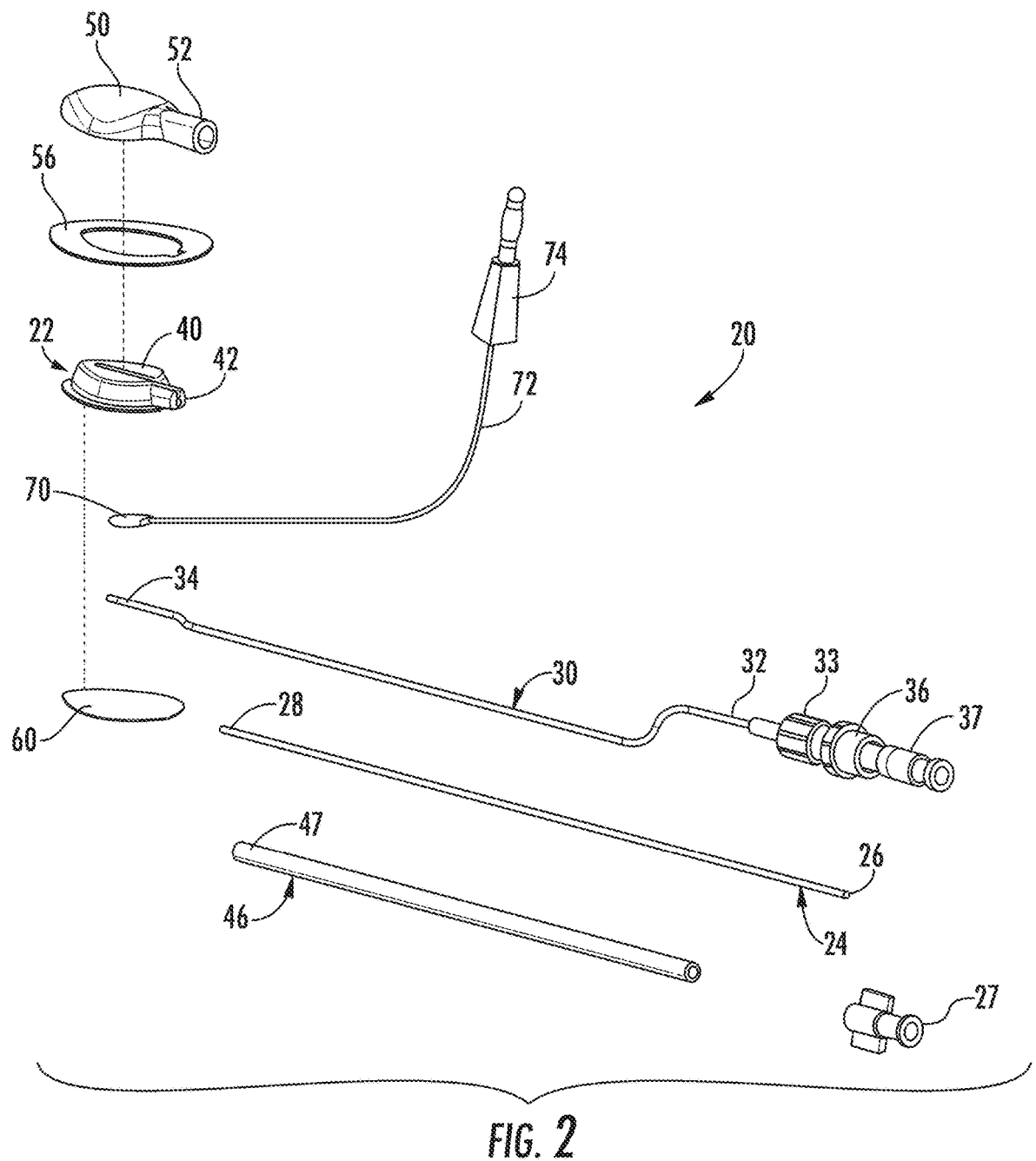
FIG. 2 is an exploded perspective view of an embodiment of a reservoir assembly for use with a device and system for interventional for drug delivery.

As shown in FIG. 2, the reservoir assembly 20 comprises a reservoir 22 for containing a drug for delivery. An inlet conduit 24 provides fluid flow to the reservoir 22 from a proximal end 26 external to a body of the patient to a distal end 28 at the reservoir. An outlet conduit 30 provides fluid flow from the reservoir 22 from a distal end 34 at the reservoir to a proximal end 32 external to the body of the patient. The proximal end 26 of the inlet conduit 24 receives a luer wing fitting 27 for controlling the delivery of fluid to the reservoir 22 via the inlet conduit. The proximal end 32 of the outlet conduit 30 has a male luer fitting 33 and a check valve 36 between the male luer fitting 33 and an outer female luer fitting 37. The fittings 33, 37 and the check valve 36 allow fluid to pass from the reservoir 22 and out of the proximal end 32 of the outlet conduit 30.

Referring to FIGS. 6 and 7B-14, the reservoir 22 is generally shaped in the form of an arrowhead, including a body portion 40 and a tubular protrusion 42. The body 40 of the reservoir 22 defines an inner chamber 41 which is open at the bottom. A semi-permeable membrane 60 spans the bottom of the reservoir 22 for sealing the chamber 41 such that the chamber is a completely enclosed space. The protrusion 42 is solid element extending proximally from the body 40. The protrusion 42 defines a passage 43 opening into the chamber 41. The passage 43 is sized for receiving the distal end 28 of the inlet conduit 24 such that the inlet conduit is in fluid communication with the chamber 41. The upper outer surface of the protrusion 42 and the contiguous upper outer surface of the body portion 40 of the reservoir 22 defines a linear groove 44. The groove 44 terminates distally in an opening 45 through the body portion 40 of the reservoir 22 and into the chamber 45. The groove 44 is configured for receiving the distal end 34 of the outlet conduit 30 for fluid communication of the chamber 41 with the outlet conduit 30. Because the groove 44 is linear, the inlet opening 43 into the chamber 41 is directly opposite the inlet opening 45.

The reservoir 22 is formed from polyethylene terephthalate (PET). It is understood that the reservoir may be formed from any other soft flexible material that is also biocompatible. The membrane 60 may comprise natural or synthetic polyomers including, but not limited to, polysulfone, polycarbonate, polyamide, or polyacryl-polyamide acrylate. Organic membranes can include polyethersulfone (PES), polyacrylonitrile (PAN), polytetrafluoroethylene (PTFE), sulfonated tetrafluoroethylene copolymer (Nafion), polyamide-imide (PAI), and polyvinylidenedifluoride (PVDF), polyphenylene oxide (PPO), polystyrene, nylon, polyether ether ketone (PEEK), hydrophilic and hydrophobic polyester (PETE), or polypropylene. Natural polymers may include natural rubber and cellulose (cellulose acetate).

Figure 3:
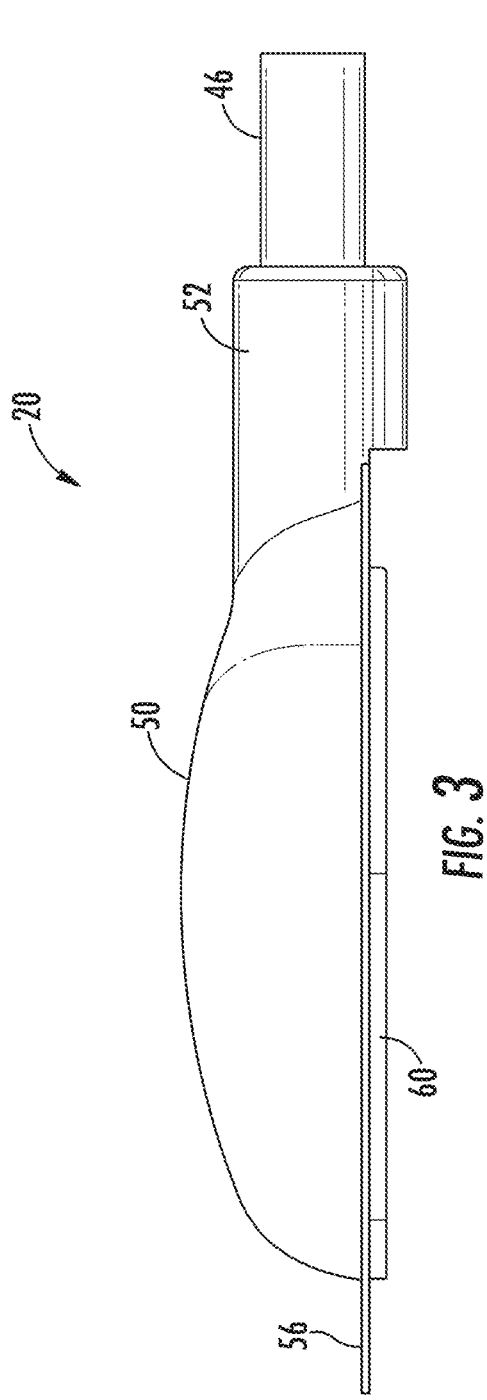
FIG. 3 is a left side elevation view of the reservoir assembly as shown in FIG. 2.
Figure 4:
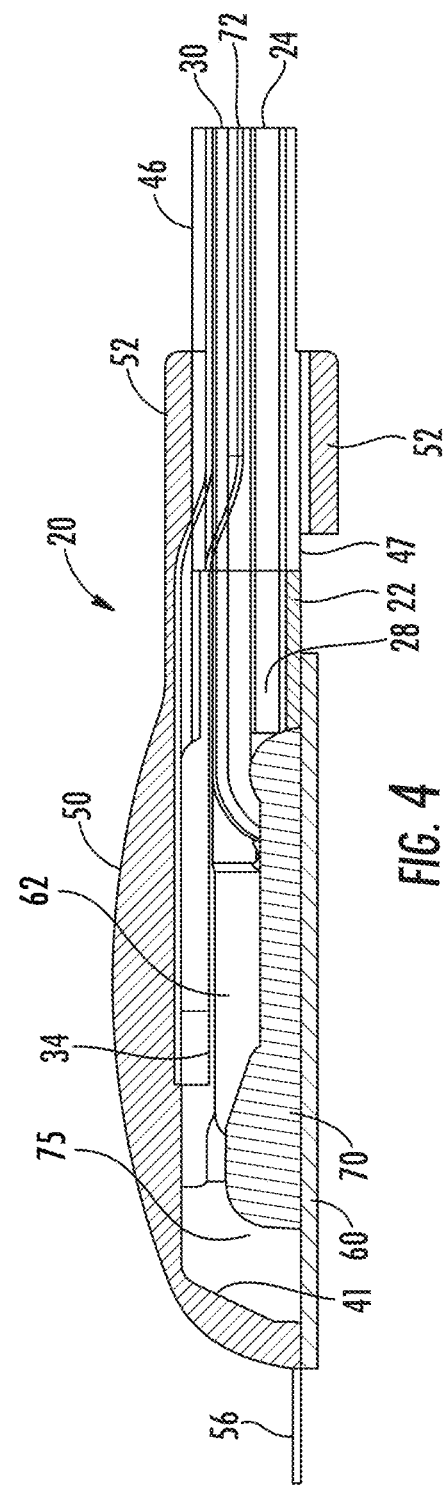
FIG. 4 is a longitudinal cross-section view of the reservoir assembly as shown in FIG. 3.
Figure 5:
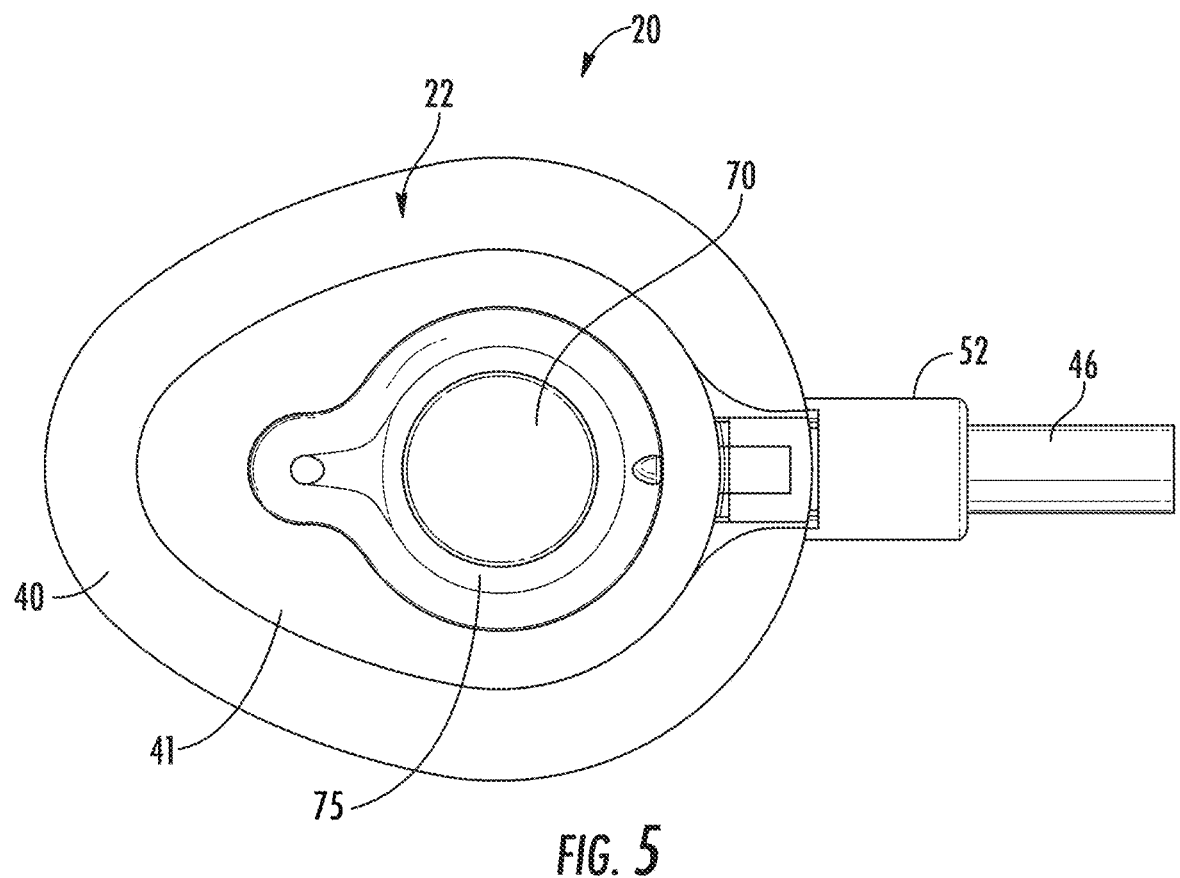
FIG. 5 is a bottom plan view of the reservoir assembly as shown in FIG. 3 with the membrane removed.
Figure 6:
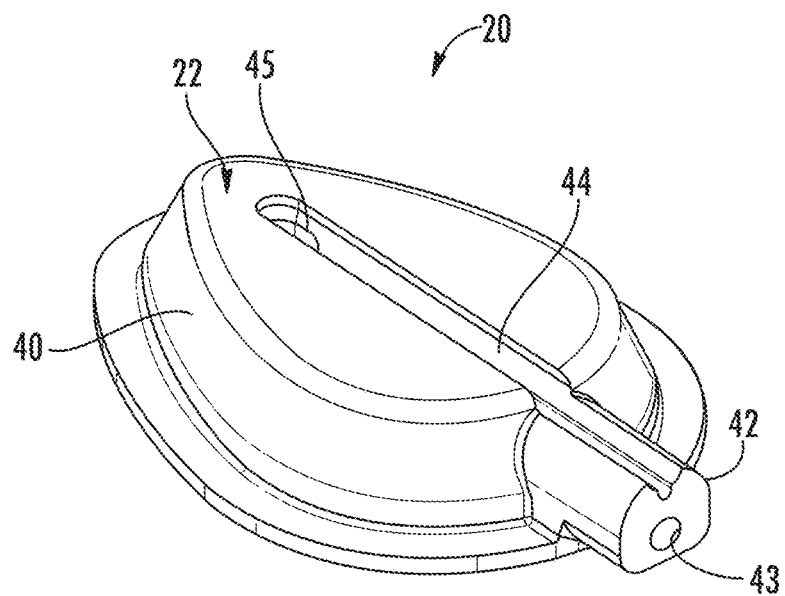
FIG. 6 is a top perspective view of an embodiment of a reservoir for use with the reservoir assembly as shown in FIG. 2.
Figure 7A:
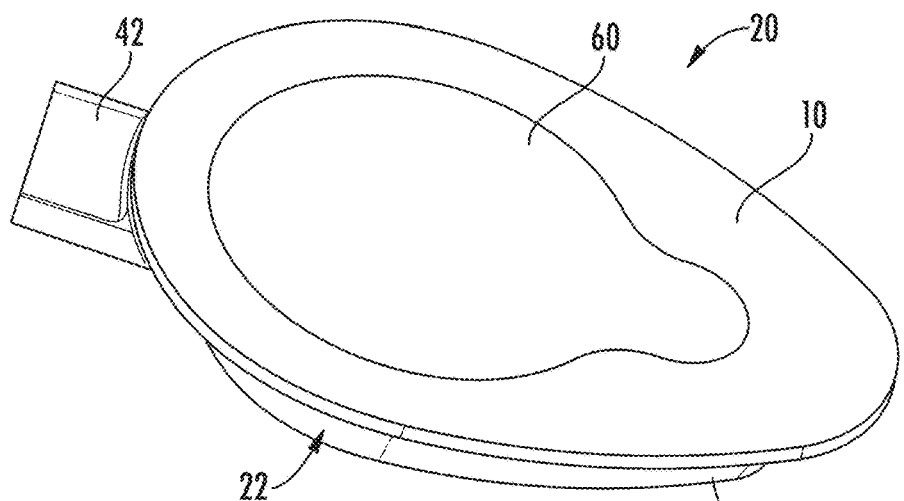
FIG. 7A is a bottom perspective view of the reservoir as shown in FIG. 6 including a membrane.
Figure 7B:
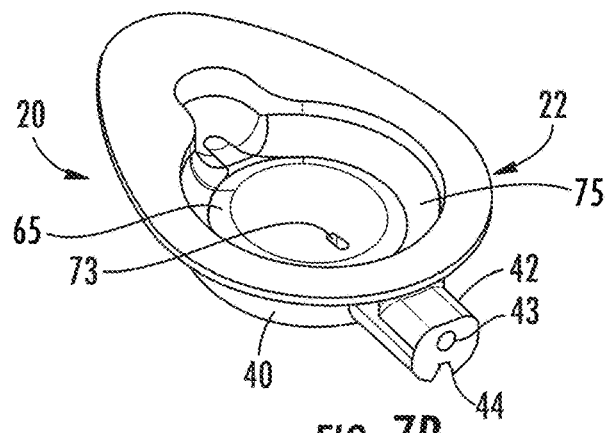
FIG. 7B is a bottom perspective view of the reservoir as shown in FIG. 6 with the membrane removed.

A protective silicone cap 50 is generally shaped liked the reservoir 22 and includes a tubular proximal protrusion 52. As seen in FIGS. 3-5, the cap 50 defines a pocket 51 corresponding in size to the reservoir 22 for encasing the reservoir. The tubular protrusion 52 is configured to receive the protrusion 42 of the reservoir. The inlet and outlet conduits 24, 30 are housed in a protective silicone sheath 46 (FIG. 2). A distal end 47 of the sheath 46 which fits in the protrusion 52 from the cap 50 and butts against the end of the protrusion 42 from the reservoir 22 (FIG. 4). The distal ends 28, 34 of the inlet and outlet conduits 24, 30 extend distally from the sheath 46 into the passage 43 and groove 44, respectively. A disc-shaped fixation skirt 56 is captured between the reservoir 22 and the cap 50. The fixation skirt 56 is formed of polyester mesh which provides openings for suturing the reservoir 22 to body tissue for securing the reservoir to the target site in the body. Anchor points for sutures can also be formed in the skirt 56. Alternatively, the reservoir 22 may be fixed to a target site of body tissue using a biological adhesive, microneedles, or staples, either alone or in combination with sutures.

Figure 8:
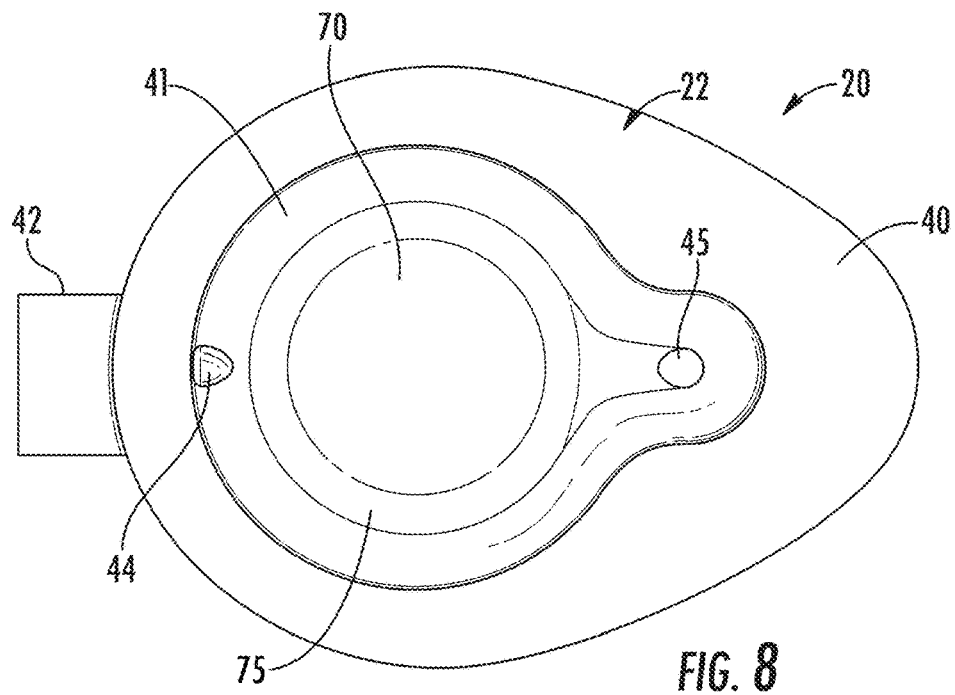
FIG. 8 is a bottom plan view of the reservoir as shown in FIG. 6 with the membrane removed and electrode in place.
Figure 9:
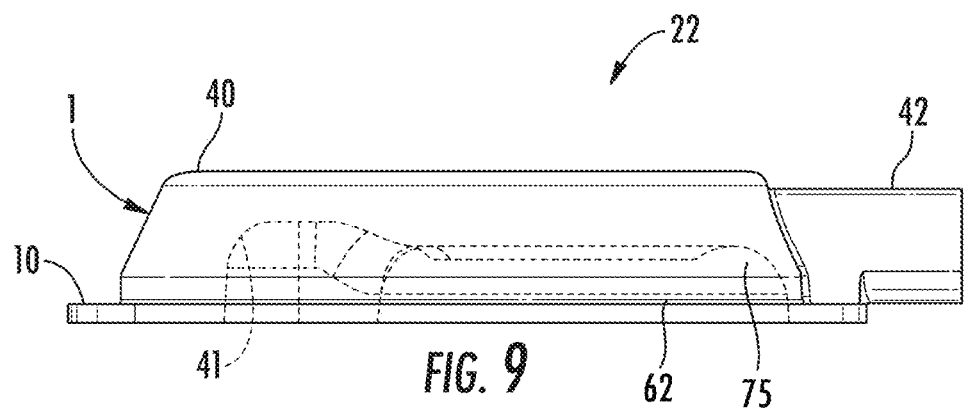
FIG. 9 is a left side elevation view of the reservoir as shown in FIG. 6, the right side elevation view being a mirror image thereof.
Figure 10:
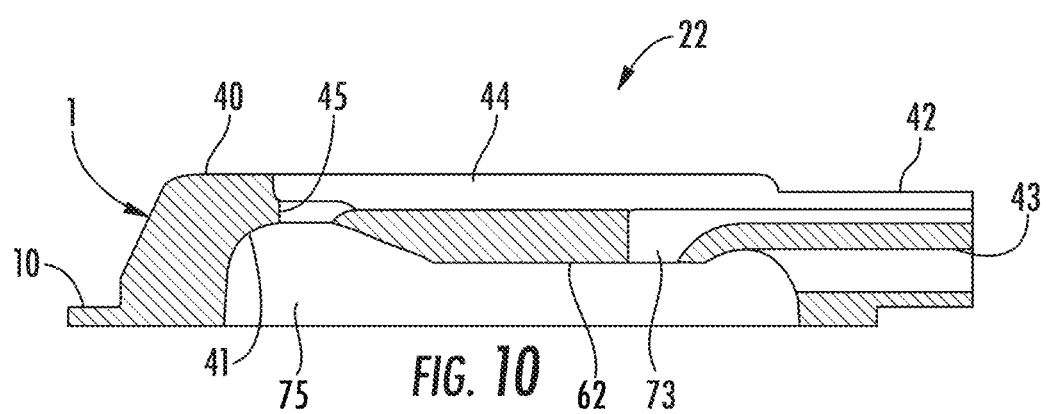
FIG. 10 is a longitudinal cross-section view of the reservoir as shown in FIG. 9.
Figure 11:
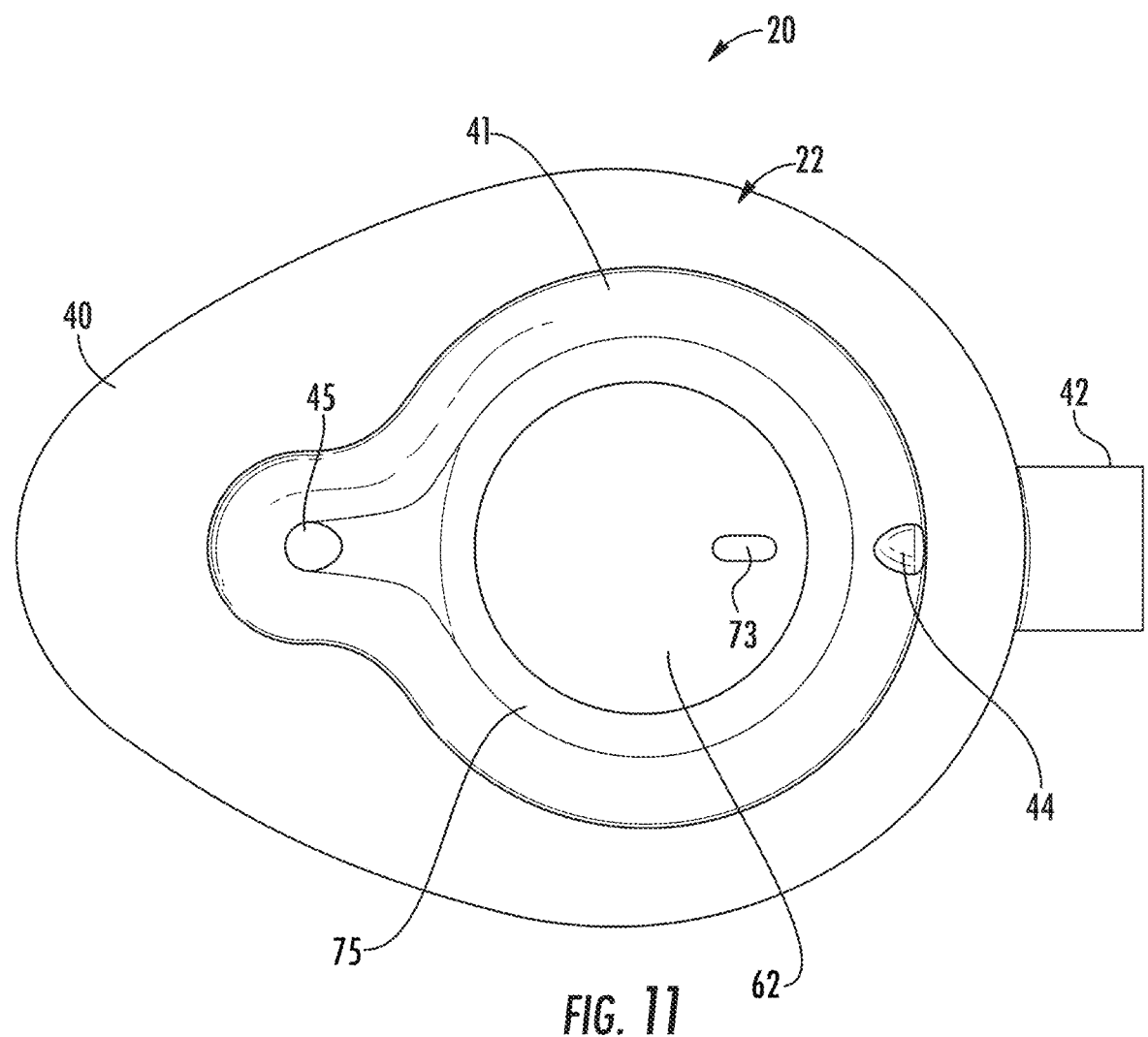
FIG. 11 is a bottom plan view of the reservoir as shown in FIG. 6 with the membrane and electrode removed.
Figure 12:
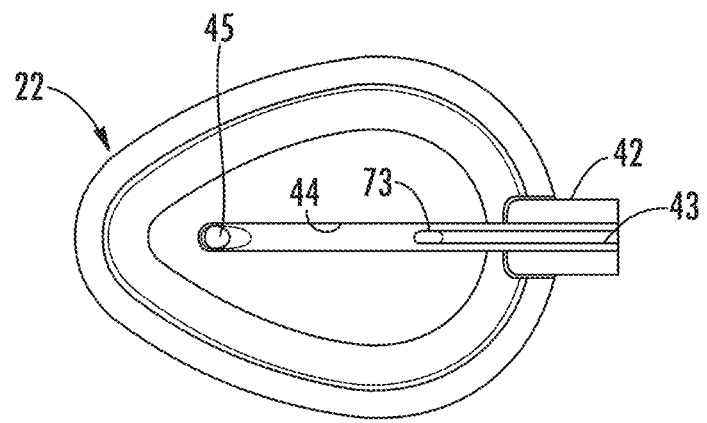
FIG. 12 is a top plan view of the reservoir as shown in FIG. 6.
Figure 13:
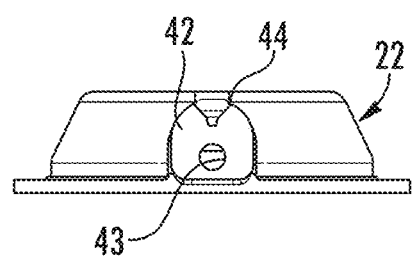
FIG. 13 is a front end elevation view of the reservoir as shown in FIG. 6.
Figure 14:
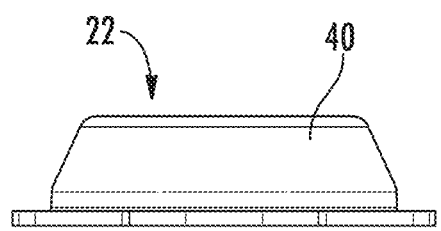
FIG. 14 is rear end elevation view of the reservoir as shown in FIG. 6.

A platinum electrode 70 is placed on a platform 62 integral with the center of the body of the reservoir 22 (FIGS. 5 and 8). The platform 62 extends inwardly from an inner surface of the body 40 into the chamber 41. The walls of the platform 62 are spaced from the adjacent inner surface of the reservoir 22 forming a trough 75 surrounding the platform 62 and electrode 70. The electrode 70 is connected to a power source via an electrical cable 72 exiting an opening 73 in the reservoir 22. The cable 72 passes along the groove 44 underneath the outlet conduit 30 and through the sheath 46. The cable 72 terminates at a plug 74 for accessing an external power supply.

In use, the reservoir assembly 20 is implanted at a target site he body of patient. In the embodiment shown in FIG. 1, the reservoir assembly 20, including the reservoir 22 and body portion 40 containing drug and a source electrode 70, is secured to the anterior surface of a pancreas. The protective sheath 46, surrounding the inlet and outlet conduits 24, 30 and the electrical cable 72, emerges through the abdomen for connection to an infusion pump and power source, respectively. To complete the iontophoresis device and system, a second counter electrode (not shown) is placed on the skin of the patient, typically on the back, for completing the electrical circuit. A fluid cargo including a drug to be delivered is supplied through the inlet conduit 24 into the chamber 41 of the reservoir 22. An electrical field is generated between the source electrode 70 and the counter electrode for moving the drug across the membrane 60 and into the tissue of the pancreas and a tumor.

Figure 15:
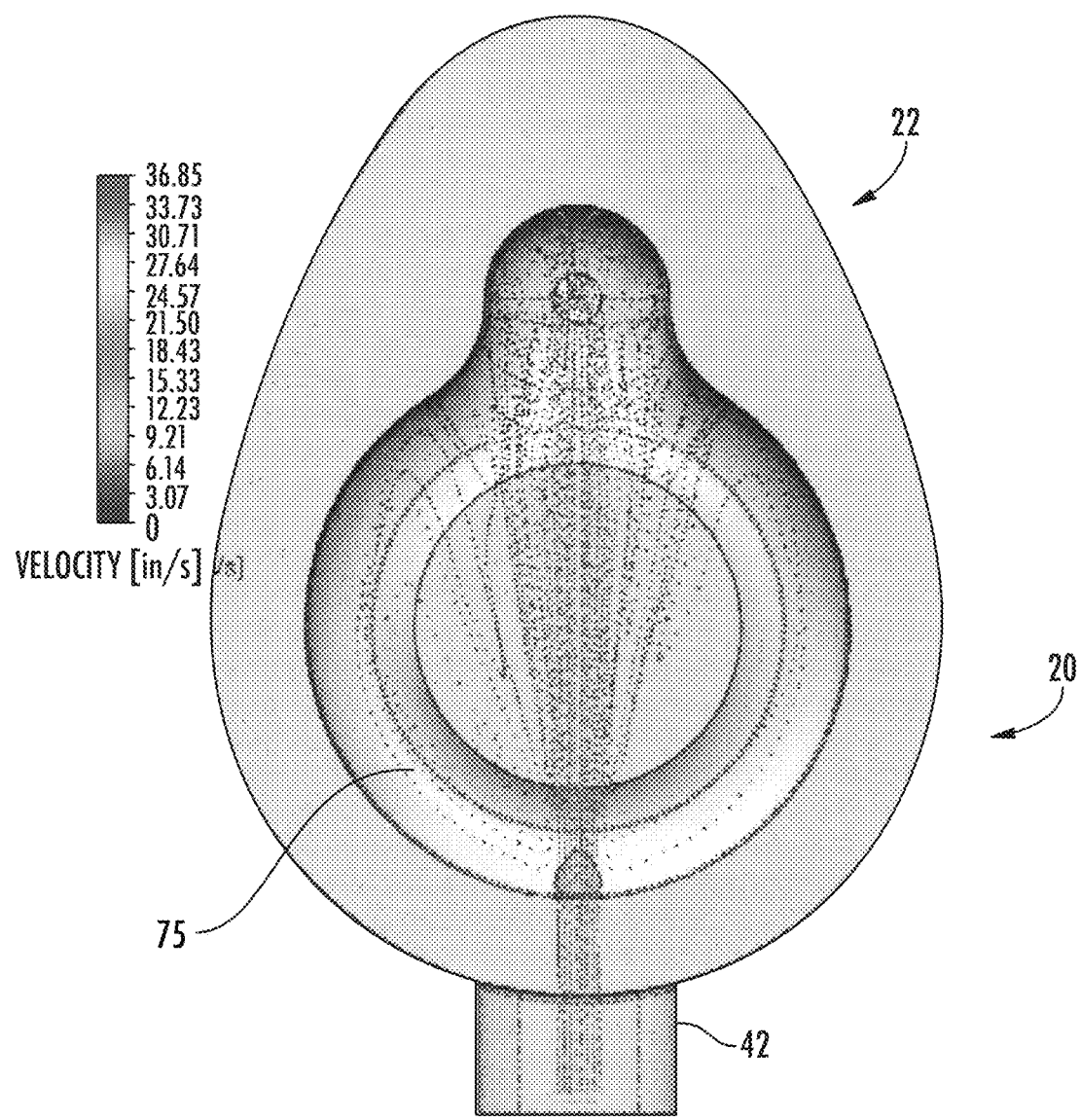
FIG. 15 is a schematic view of the reservoir assembly as shown in FIG. 2 showing a computer-generated flow animation.
Figure 16A:
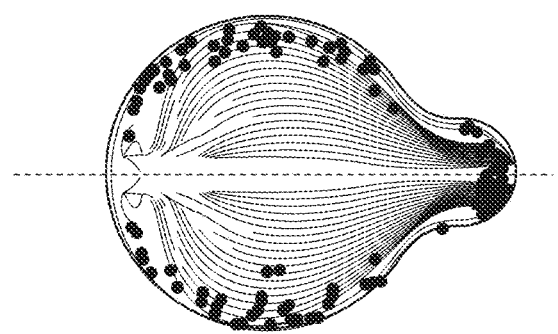
FIGS. 16A-16C is a schematic view of the reservoir assembly as shown in FIG. 2 showing a 3-D simulation of bubble removal.
Figure 16B:
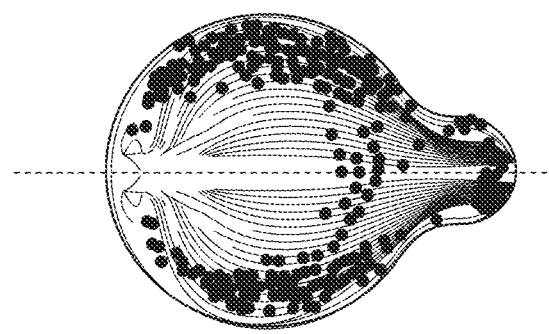
Figure 16C:
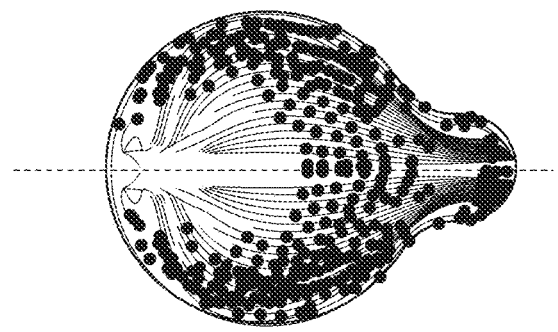
Figure 17A:
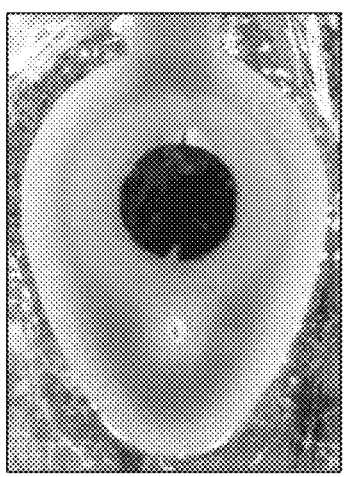
FIGS. 17A-17E is a series of photographs showing the reservoir assembly demonstrating experimental verification of fluid flow for bubble removal.
Figure 17B:
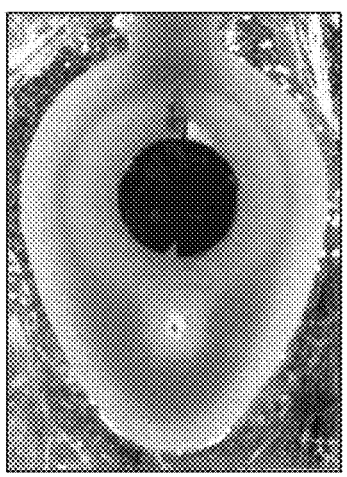
Figure 17C:
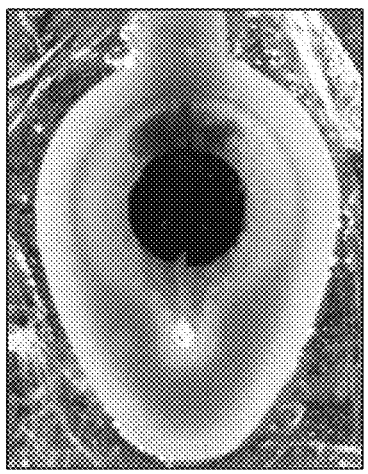
Figure 17D:
Figure 17E:
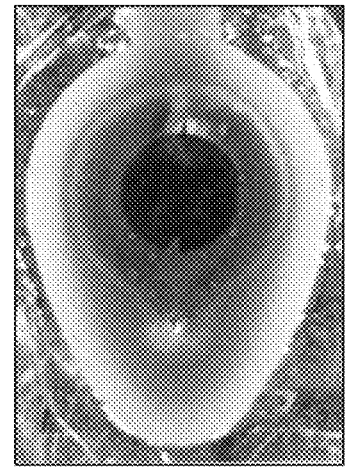

Electrolysis at the source electrode 70 causes gas bubbles to form, which adhere to the electrode surface. Flow of the cargo fluid through the body 40 of the reservoir 22 and over the electrode 70 and around platform 62 in the trough 75 removes and carries the bubbles from the chamber 41 through the outlet opening 45. The trough 75 formed around the platform 62 holding the electrode 70 and the aligned fluid inlet opening 24 and outlet opening 30 create a flow pattern that effectively sweeps the bubbles off of the electrode surface and out of the chamber 41 of the reservoir 22. In particular, as shown in FIG. 15, the area of highest fluid flow rate is across the raised platform 62 on which the electrode 70 is positioned so that bubbles that form on the electrode are swept into the trough 75. FIG. 16 is a computer simulation showing bubbles randomly introduced into the reservoir and then carried off the electrode by the fluid flow. FIG. 16A shows the initial introduction of bubbles into the simulation and clearly demonstrates the bubbles being carried into the trough. FIGS. 16B and 16C continue this simulation and show increasing amounts of bubbles collecting in the trough. The bubbles accumulate at the outlet opening 30 in the distal end of the chamber 41 opposite to the inlet opening 24 prior to exiting. The bubbles are then carried out of the chamber 41 of the reservoir 22 by the fluid flow. Similarly, FIG. 17A shows the reservoir first filled with a clear liquid. (FIG. 17A). A blue dye is introduced (FIG. 17B) and progresses toward the distal exit opening 45 (FIGS. 17B-17E) showing fluid flow.

The reservoir assembly has many advantages, including its use in a system for drug delivery using iontophoresis. The design of the reservoir assembly minimizes gas bubble formation and adherence to the surface of the electrode. Gas bubbles that do form are swept away by fluid flow through the reservoir and do not collect on the electrode. The reservoir assembly and iontophoresis system can be used to treat other solid tumors such as, but not limited to, sarcomas, head and neck, and breast cancer.

Although the present reservoir assembly has been shown and described in considerable detail with respect to only a few exemplary embodiments thereof, it should be understood by those skilled in the art that we do not intend to limit the reservoir assembly to the embodiments since various modifications, omissions and additions may be made to the disclosed embodiments without materially departing from the novel teachings and advantages, particularly in light of the foregoing teachings. Accordingly, we intend to cover all such modifications, omission, additions and equivalents as may be included within the spirit and scope of the reservoir assembly as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. An iontophoresis system for local drug delivery through a target site of internal body tissue, the iontophoresis system comprising:
   a source electrode;
   a counter electrode in electrical communication with the source electrode, the counter electrode being configured to cooperate with the source electrode to form a localized electric field at the target site;
   a fluid cargo including the drug, the fluid cargo capable of being delivered through the tissue of the target site when exposed to the localized electric field formed between the source electrode and the counter electrode;
   a surgically implantable reservoir adapted to be secured to the target site, the reservoir comprising
      a housing having an inner surface defining an enclosed chamber and an inlet opening and an outlet opening for cargo flow through the chamber from the inlet opening to the outlet opening, wherein at least a portion of the housing comprises a membrane, the membrane allowing drug to pass through the membrane and into the targeted tissue when a localized electric field is applied,
      a platform extends inwardly into the chamber from the inner surface of the housing between the inlet opening and the outlet opening such that the platform and an adjacent portion of the inner surface of the housing define a trough surrounding the platform, the platform configured for holding the source electrode, and
      means for securing the housing to the tissue of the target site,
   wherein cargo flow through the reservoir from the inlet opening to the outlet opening moves gas bubbles formed by electrolysis from a surface of the source electrode and carries the bubbles in the trough and through the outlet opening.

2. The iontophoresis system as recited in claim 1, wherein the source electrode comprises platinum.

3. The iontophoresis system as recited in claim 1, wherein the cargo comprises anesthetics, vaccines, chemotherapeutic agents, metabolites, immunomodulators, antioxidants, antibiotics, and ion channel regulators, or hormones.

4. The iontophoresis system as recited in claim 3, wherein the cargo further comprises one or more pharmaceutically acceptable carriers, excipients, or diluents.

5. The iontophoresis system as recited in claim 1, wherein the cargo comprises a therapeutic agent.

6. The iontophoresis system as recited in claim 5, wherein the therapeutic agent comprises gemcitabine.

7. The iontophoresis system as recited in claim 1, further comprising a source of cargo in fluid communication with the inlet opening for a flow of cargo into the housing.

8. The iontophoresis system as recited in claim 1, wherein the outlet opening is opposite the inlet opening.

9. The iontophoresis system as recited in claim 1, wherein the housing securing means comprises a skirt around at least a portion of the reservoir, wherein the skirt is configured to be sutured to tissue at the target site.

10. The iontophoresis system as recited in claim 9, wherein the skirt comprises a plurality of anchor points defining suture openings.

11. The iontophoresis system as recited in claim 1, wherein the housing securing means comprises a biological adhesive.

12. The iontophoresis system as recited in claim 1, wherein the membrane comprises natural or synthetic polymers, including cellulose acetate, polysulfone, polycarbonate, polyamide, or polyacryl-polyamide acrylate.

13. A method for local delivery of drug molecules by iontophoresis through a target site of internal body tissue of a patient, the drug delivery method comprising the steps of:
   providing a source electrode;
   providing a counter electrode in electrical communication with the source electrode, the counter electrode being configured to cooperate with the source electrode to form a localized electric field at the target site;
   implanting in the patient a reservoir adapted to be secured to the target site, the reservoir comprising
      a housing having an inner surface defining an enclosed chamber having an inlet opening and an outlet opening for fluid flow through the chamber, and at least a portion of the housing comprising a membrane,
      a platform disposed in the housing and extending inwardly into the chamber from the inner surface of the housing such that the platform and an adjacent portion of the inner surface of the housing define a trough surrounding the platform, the platform adapted for holding the source electrode, and
      means for securing the housing to the tissue of the target site,
   delivering a fluid cargo including the drug to the inlet opening of the housing, the fluid cargo capable of being delivered through the tissue of the target site when exposed to the localized electric field formed between the source electrode and the counter electrode,
   wherein the membrane allows drug to pass through the membrane and into the targeted tissue when a localized electric field is applied, and
   wherein cargo flow through the reservoir from the inlet opening to the outlet opening moves gas bubbles formed by electrolysis from a surface of the source electrode and carries the bubbles in the trough and through the outlet opening.

14. The local drug delivery method by iontophoresis through a target site of internal body tissue of a patient as recited in claim 13, wherein the step of delivering fluid cargo comprises a continuous flow of fluid cargo.

15. The local drug delivery method by iontophoresis through a target site of internal body tissue of a patient as recited in claim 13, wherein the step of providing a counter electrode comprises placing the counter electrode on a selected skin location of the patient.

\* \* \* \* \*